US010552619B2

(12) United States Patent
Xing et al.

(10) Patent No.: US 10,552,619 B2
(45) Date of Patent: Feb. 4, 2020

(54) TECHNOLOGIES FOR SECURE TRUSTED I/O ACCESS CONTROL

(71) Applicant: Intel Corporation, Santa Clara, CA (US)

(72) Inventors: Bin Xing, Hillsboro, OR (US); Pradeep M. Pappachan, Hillsboro, OR (US); Siddhartha Chhabra, Hillsboro, OR (US); Reshma Lal, Hillsboro, OR (US); Steven B. McGowan, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 310 days.

(21) Appl. No.: 14/974,944

(22) Filed: Dec. 18, 2015

(65) Prior Publication Data

US 2017/0024569 A1    Jan. 26, 2017

Related U.S. Application Data

(60) Provisional application No. 62/194,763, filed on Jul. 20, 2015, provisional application No. 62/195,148, (Continued)

(51) Int. Cl.
*H04K 1/00* (2006.01)
*H04L 9/32* (2006.01)
(Continued)

(52) U.S. Cl.
CPC ............ *G06F 21/602* (2013.01); *G06F 13/28* (2013.01)

(58) Field of Classification Search
CPC ......... G06F 21/602; G06F 21/57; G06F 13/28
(Continued)

(56) References Cited

U.S. PATENT DOCUMENTS 7,716,389 B1 * 5/2010 Bruce ..................... G06F 13/28
                                                370/338
7,734,933 B1 * 6/2010 Marek .................... G06F 21/57
                                                711/173
(Continued)

FOREIGN PATENT DOCUMENTS

EP          1801700        6/2007
WO    WO2012010205 A1 *   1/2012  ............ G06F 21/22
WO        2013/147872    10/2013

OTHER PUBLICATIONS

Extended European search report for European patent application No. 16828189.7, dated Feb. 19, 2019 (5 pages).
(Continued)

*Primary Examiner* — Aravind K Moorthy
(74) *Attorney, Agent, or Firm* — Barnes & Thornburg LLP

(57) ABSTRACT

Technologies for trusted I/O (TIO) include a computing device with a cryptographic engine and one or more I/O controllers. The computing device executes a TIO core service that has a cryptographic engine programming privileged granted by an operating system. The TIO core service receives a request from an application to protect a DMA channel. The TIO core service requests the operating system to protect the DMA channel, and the operating system verifies the cryptographic engine programming privilege of the TIO core service in response. The operating system programs the cryptographic engine to protect the DMA channel in response to verifying the cryptographic engine programming privilege of the TIO core service. If a privileged delegate determines that a user has confirmed termination of protection of the DMA channel, the TIO core service may unprotect the DMA channel. Other embodiments are described and claimed.

24 Claims, 3 Drawing Sheets

Related U.S. Application Data filed on Jul. 21, 2015, provisional application No. 62/198,201, filed on Jul. 29, 2015.

(51) Int. Cl.
| | | |
|---|---|---|
| *G06F 11/30* | (2006.01) | |
| *G06F 7/04* | (2006.01) | |
| *G06F 12/14* | (2006.01) | |
| *G06F 21/60* | (2013.01) | |
| *G06F 13/28* | (2006.01) | |

(58) Field of Classification Search
USPC .......... 713/193, 168; 726/2, 23, 26; 380/255
See application file for complete search history.

(56) References Cited

U.S. PATENT DOCUMENTS

| | | | | | |
|---|---|---|---|---|---|
| 8,566,612 | B2* | 10/2013 | Davis | | G06F 21/72 |
| | | | | | 370/218 |
| 8,631,212 | B2* | 1/2014 | Kegel | | G06F 12/1081 |
| | | | | | 711/152 |
| 2003/0084309 | A1* | 5/2003 | Kohn | | G06F 1/3203 |
| | | | | | 713/189 |
| 2004/0205203 | A1* | 10/2004 | Peinado | | G06F 12/1425 |
| | | | | | 709/229 |
| 2007/0022224 | A1* | 1/2007 | Bowler | | G06F 13/28 |
| | | | | | 710/22 |
| 2008/0109570 | A1* | 5/2008 | Leonard | | G06F 13/28 |
| | | | | | 710/22 |
| 2008/0209203 | A1* | 8/2008 | Haneda | | G06F 21/72 |
| | | | | | 713/150 |
| 2009/0287895 | A1* | 11/2009 | Foley | | G06F 12/1433 |
| | | | | | 711/163 |
| 2011/0154023 | A1* | 6/2011 | Smith | | G06F 21/78 |
| | | | | | 713/155 |
| 2012/0072906 | A1* | 3/2012 | Tsirkin | | G06F 12/1009 |
| | | | | | 718/1 |
| 2012/0159184 | A1* | 6/2012 | Johnson | | G06F 21/6218 |
| | | | | | 713/189 |
| 2013/0085880 | A1* | 4/2013 | Roth | | G06F 21/602 |
| | | | | | 705/26.1 |
| 2013/0283391 | A1* | 10/2013 | Mangalampalli | | G06F 21/10 |
| | | | | | 726/26 |
| 2014/0096260 | A1* | 4/2014 | Triantafillou | | G06F 21/57 |
| | | | | | 726/26 |
| 2014/0150056 | A1* | 5/2014 | Williams | | G06F 21/36 |
| | | | | | 726/2 |
| 2014/0188732 | A1* | 7/2014 | Kobres | | H04L 63/0442 |
| | | | | | 705/64 |
| 2015/0007265 | A1* | 1/2015 | Aissi | | G06F 21/60 |
| | | | | | 726/3 |
| 2017/0024569 | A1* | 1/2017 | Xing | | G06F 13/28 |
| 2017/0026181 | A1* | 1/2017 | Chhabra | | G06F 9/45558 |
| 2017/0083465 | A1* | 3/2017 | Jan | | G06F 13/28 |

OTHER PUBLICATIONS

International search report for PCT application No. PCT/US2016/038394, dated Sep. 22, 2016 (3 pages).

Written opinion for PCT application No. PCT/US2016/038394, dated Sep. 22, 2016 (6 pages).

\* cited by examiner

TECHNOLOGIES FOR SECURE TRUSTED I/O ACCESS CONTROL

CROSS-REFERENCE TO RELATED APPLICATIONS

The present application claims priority under 35 U.S.C. § 119(e) to U.S. Provisional Patent Application Ser. No. 62/194,763, entitled "CRYPTOGRAPHIC PROTECTION OF I/O DATA FOR DMA CAPABLE I/O CONTROLLERS," which was filed on Jul. 20, 2015, to U.S. Provisional Patent Application Ser. No. 62/195,148, entitled "CRYPTOGRAPHIC PROTECTION OF I/O DATA FOR DMA CAPABLE I/O CONTROLLERS," which was filed on Jul. 21, 2015, and to U.S. Provisional Patent Application Ser. No. 62/198,201, entitled "SECURE I/O DEVICE MANAGEMENT FOR HARDWARE CRYPTOGRAPHY TRUSTED I/O," which was filed on Jul. 29, 2015.

BACKGROUND

Typical computing devices may rely on software agents, such as anti-malware agents, for security. However, it is difficult to keep up with the increasing number of malware attacks on users' devices. To combat the malware threat, there is a trend to protect security sensitive software by running it inside a Trusted Execution Environment (TEE). TEEs provide a sterile environment that can protect secrets even when other parts of the system are compromised. Examples of TEEs include Intel® Software Guard Extensions (Intel® SGX), secure virtual machines (VMs), and a converged security engine (CSE). The TEE, while useful to protect secrets within the TEE, may not protect I/O data such as user and sensor data that is communicated into and/or out of the secure "container." The security requirements for trusted I/O vary per use case and device, and involve flavors and combinations of confidentiality, integrity, liveliness, and replay protection.

On a personal computer platform, securing I/O has several complexities. To protect I/O for a given usage, many input devices may need to be secured because the platform often has multiple devices of the same category connected via different I/O controllers, and a user may dynamically select any one of the connected devices during use. For example, when inputting text, the user may choose to use an embedded keyboard, a USB keyboard, or a Bluetooth (BT) keyboard. The user may also use a touch screen to input data. This means all keyboards and touch input may need to be secured for a usage that requires secure text input. Additionally, I/O devices may be used by secure applications and by regular applications, which means that those devices may be required to switch dynamically from being protected to being in the clear and vice versa.

Hardware cryptographic trusted I/O (TIO) provides a hardware architecture to protect I/O data for TEEs such as SGX secure enclaves, virtual machine monitors (VMMs), and other TEEs. Hardware cryptographic TIO provides a mechanism to protect the I/O data using a central cryptographic engine (CE) in the direct memory access (DMA) path between the I/O device and the memory, thereby protecting the I/O data as it moves on or off the package.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
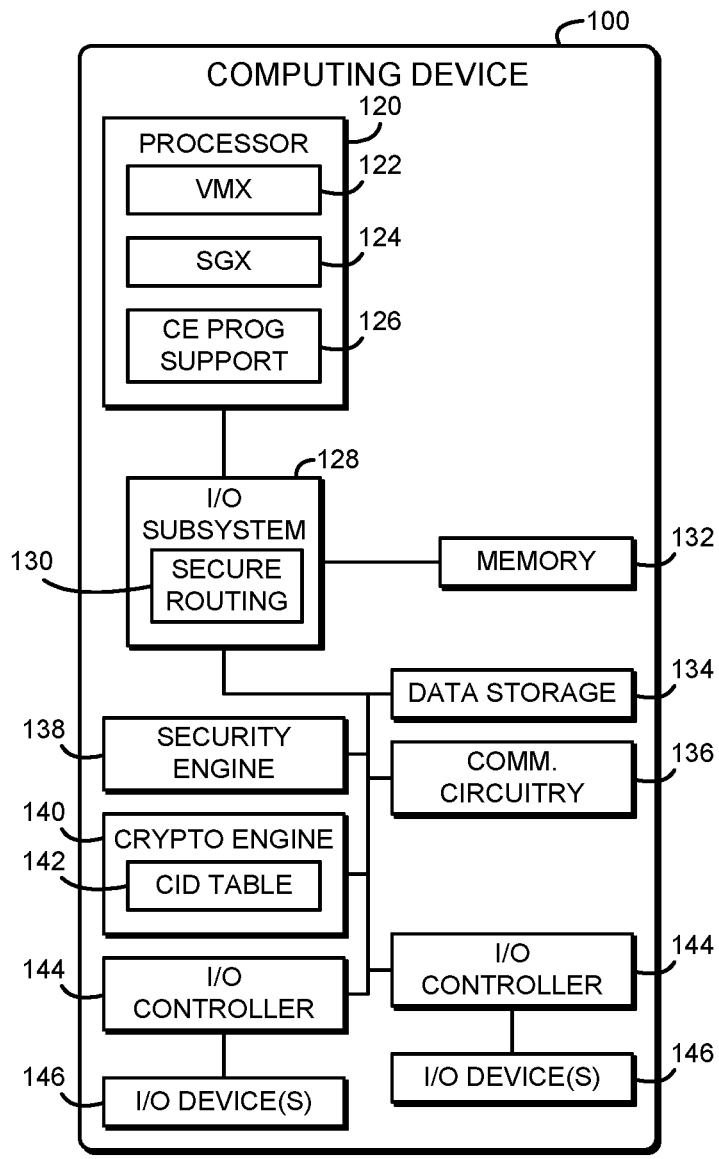
FIG. 1 is a simplified block diagram of at least one embodiment of a computing device for trusted I/O access control.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a computing device 100 for secure I/O programming access control includes, among other components, a processor 120, main memory 132, a hardware cryptographic engine 140, and one or more I/O controllers 144 in communication with one or more I/O devices 146. In use, the cryptographic engine 140 provides on-the-fly encryption and decryption of data transferred via direct memory access (DMA) transactions between the I/O controllers 144 and the memory 132. Each DMA transaction is tagged with a channel ID (CID) representing a flow of data associated with a particular I/O device 146 or set of I/O devices 146. The cryptographic engine 140 uses the CID to reliably identify transactions that must be protected, retrieve the corresponding encryption keys, and perform appropriate cryptographic operations on the DMA data. The computing device 100 establishes two independent trust domains: an operating system (and/or a VMM) and a secure-enclave-based TIO stack. The components of the secure-enclave-based TIO stack may trust each other using secure enclave attestation. However, the operating system and the secure-enclave-based TIO stack may not trust each other; for example, the operating system may not decrypt encrypted I/O data, and the TIO stack may not take complete control of the I/O devices 146. A privileged TIO core service is trusted by both the operating system and the secure-enclave-based TIO stack. In use, as described further below, a secure application enclave may request the TIO core service to encrypt a DMA channel, and in response the TIO core service submits the request to the operating system to protect the DMA channel. In some embodiments, the request may designate a privileged delegate hosted by the TIO core service that may determine whether a user has confirmed that a secure TIO session has been terminated.

Thus, the computing device 100 allows the TIO core service to protect I/O devices 146 on behalf of secure applications while also preventing denial of service (DoS) attacks, for example by preventing a malicious secure enclave from refusing to release an encrypted I/O device 146. Additionally, the computing device 100 may protect user input even if the original secure application crashes, while still allowing the operating system to reclaim an encrypted device. Further, the computing device 100 may provide flexible security by requiring only a limited number of modules (e.g., secure enclaves hosted by the TIO core service) to be trusted by the operating system, rather than requiring an extensive number of modules to be whitelisted or otherwise trusted (e.g., without requiring every secure enclave, trusted application, trusted device driver, and/or other trusted execution environment of the computing device 100 to be trusted).

The computing device 100 may be embodied as any type of computation or computer device capable of performing the functions described herein, including, without limitation, a computer, a desktop computer, a workstation, a server, a laptop computer, a notebook computer, a tablet computer, a mobile computing device, a wearable computing device, a network appliance, a web appliance, a distributed computing system, a processor-based system, and/or a consumer electronic device. As shown in FIG. 1, the computing device 100 illustratively includes a processor 120, an input/output subsystem 128, a memory 132, a data storage device 134, and communication circuitry 136. Of course, the computing device 100 may include other or additional components, such as those commonly found in a desktop computer (e.g.,  various input/output devices), in other embodiments. Additionally, in some embodiments, one or more of the illustrative components may be incorporated in, or otherwise form a portion of, another component. For example, the memory 132, or portions thereof, may be incorporated in the processor 120 in some embodiments.

The processor 120 may be embodied as any type of processor capable of performing the functions described herein. The processor 120 may be embodied as a single or multi-core processor(s), digital signal processor, microcontroller, or other processor or processing/controlling circuit. As shown, the processor 120 may include hardware virtualization support 122, secure enclave support 124, and crypto engine programming support 126.

The hardware virtualization support 122 supports virtualized execution of operating systems, applications, and other software by the computing device 100. The hardware virtualization support 122 may include virtual machine extensions (VMX) support by providing two modes of execution: VMX-root mode and VMX non-root mode. The VMX-root mode allows executing software to have broad control of the computing device 100 and its hardware resources. Conversely, a hypervisor, virtual machine monitor (VMM), or host operating system (OS) may execute in VMX-root mode. The VMX non-root mode restricts access to certain hardware instructions while still implementing the ordinary ring/privilege system of the processor 120. One or more guest OSs may execute in the VMX non-root mode. Those guest OSs may execute in ring zero, similar to being executed without virtualization. The hardware virtualization support 122 may also support extended page tables (EPT), which may be embodied as hardware-assisted second-level page address translation. The hardware virtualization support 122 may be embodied as, for example, Intel® VT-x technology.

The secure enclave support 124 allows the processor 120 to establish a trusted execution environment known as a secure enclave, in which executing code may be measured, verified, and/or otherwise determined to be authentic. Additionally, code and data included in the secure enclave may be encrypted or otherwise protected from being accessed by code executing outside of the secure enclave. For example, code and data included in the secure enclave may be protected by hardware protection mechanisms of the processor 120 while being executed or while being stored in certain protected cache memory of the processor 120. The code and data included in the secure enclave may be encrypted when stored in a shared cache or the main memory 132. The secure enclave support 124 may be embodied as a set of processor instruction extensions that allows the processor 120 to establish one or more secure enclaves in the memory 132. For example, the secure enclave support 124 may be embodied as Intel® Software Guard Extensions (SGX) technology.

The crypto engine programming support 126 allows the processor 120 to program the cryptographic engine 140 to provide cryptographic protection of I/O data. In particular, the processor 120 may enable or disable encryption for certain I/O channels, and may securely provide encryption keys to the cryptographic engine 140. The crypto engine programming support 126 may be embodied as one or more specialized processor instructions (e.g., the instructions EBINDTIO, UNWRAP, or other instructions) and associated hardware, microcode, firmware, or other components of the processor 120. The crypto engine programming support 126 of the processor 120 may allow trusted software to program the cryptographic engine 140 while preventing untrusted software from programming the cryptographic engine 140.

The memory 132 may be embodied as any type of volatile or non-volatile memory or data storage capable of performing the functions described herein. In operation, the memory 132 may store various data and software used during operation of the computing device 100 such as operating systems, applications, programs, libraries, and drivers. The memory 132 is communicatively coupled to the processor 120 via the I/O subsystem 128, which may be embodied as circuitry and/or components to facilitate input/output operations with the processor 120, the memory 132, and other components of the computing device 100. For example, the I/O subsystem 128 may be embodied as, or otherwise include, memory controller hubs, input/output control hubs, platform controller hubs, integrated control circuitry, firmware devices, communication links (i.e., point-to-point links, bus links, wires, cables, light guides, printed circuit board traces, etc.) and/or other components and subsystems to facilitate the input/output operations. The I/O subsystem 128 may further include secure routing support 130. The secure routing support 130 includes hardware support to ensure I/O data cannot be misrouted in the fabric 128 under the influence of rogue software. The secure routing support 130 may be used with the cryptographic engine 140 to provide cryptographic protection of I/O data. In some embodiments, the I/O subsystem 128 may form a portion of a system-on-a-chip (SoC) and be incorporated, along with the processor 120, the memory 132, and other components of the computing device 100, on a single integrated circuit chip.

The data storage device 134 may be embodied as any type of device or devices configured for short-term or long-term storage of data such as, for example, memory devices and circuits, memory cards, hard disk drives, solid-state drives, or other data storage devices. In some embodiments, the data storage device 134 may be used to store the contents of one or more secure enclaves. When stored by the data storage device 134, the contents of the secure enclave may be encrypted to prevent unauthorized access.

The communication circuitry 136 of the computing device 100 may be embodied as any communication circuit, device, or collection thereof, capable of enabling communications between the computing device 100 and other remote devices over a network. The communication circuitry 136 may be configured to use any one or more communication technology (e.g., wired or wireless communications) and associated protocols (e.g., Ethernet, Bluetooth®, Wi-Fi®, WiMAX, etc.) to effect such communication.

In some embodiments, the computing device 100 may include a security engine 138, which may be embodied as any hardware component(s) or circuitry capable of providing security-related services to the computing device 100. In particular, the security engine 138 may include a microprocessor, microcontroller, or other embedded controller capable of executing firmware and/or other code independently and securely from the processor 120. Thus, the security engine 138 may be used to establish a trusted execution environment separate from code executed by the processor 120. The security engine 138 may communicate with the processor 120 and/or other components of the computing device 100 over a dedicated bus, such as a host embedded controller interface (HECI). The security engine 138 may also provide remote configuration, control, or management of the computing device 100. In the illustrative embodiment, the security engine 138 is embodied as a converged security and manageability engine (CSME) incorporated in a system-on-a-chip (SoC) of the computing device 100. In some embodiments, the security engine 138 may be embodied as a manageability engine, an out-of-band processor, a Trusted Platform Module (TPM), or other security engine device or collection of devices. Further, in some embodiments, the security engine 138 is also capable of communicating using the communication circuitry 136 or a dedicated communication circuit independently of the state of the computing device 100 (e.g., independently of the state of the main processor 120), also known as "out-of-band" communication.

The cryptographic engine 140 may be embodied as any microcontroller, microprocessor, functional block, logic, or other circuit or collection of circuits capable of performing the functions described herein. The cryptographic engine 140 may encrypt and/or decrypt I/O data read or written by the I/O controllers 144 in one or more direct memory access (DMA) operations to the memory 132. The cryptographic engine 140 includes an internal channel identifier (CID) table 142, which the cryptographic engine 140 uses to dynamically identify DMA channel(s) to be protected. The CID table 142 may be controlled and/or programmed by trusted software, for example using the crypto engine programming support 126 of the processor 120. The encryption keys and/or other secret information of the CID table 142 are not available to untrusted software. In some embodiments, the cryptographic engine 140 may be incorporated along with the I/O subsystem 128 and/or the processor 120 in a system-on-a-chip (SoC) of the computing device 100.

Similarly, the I/O controllers 144 may be embodied as any embedded controller, microcontroller, microprocessor, functional block, logic, or other circuit or collection of circuits capable of performing the functions described herein. In some embodiments, one or more of the I/O controllers 144 may be embedded in another component of the computing device 100 such as the I/O subsystem 128 and/or the processor 120. Additionally or alternatively, one or more of the I/O controllers 144 may be connected to the I/O subsystem 128 and/or the processor 120 via an expansion bus such as PCI Express (PCIe) or other I/O connection. As further described below, the I/O controllers 144 communicate with one or more I/O devices 146, for example over a peripheral communications bus (e.g., USB, Bluetooth, etc.). The I/O devices 146 may be embodied as any I/O device, such as human interface devices, keyboards, mice, touch screens, microphones, cameras, and other input devices, as well as displays and other output devices. As described above, the I/O controllers 144 and associated DMA channels are uniquely identified using identifiers called channel identifiers (CIDs). Each I/O controller 144 may assert an appropriate CID with every DMA transaction, for example as part of a transaction layer packet (TLP) prefix, to uniquely identify the source of the DMA transaction and provide liveness protections. The CID also enables the isolation of I/O from different devices 146.

In use, the cryptographic engine 140 may snoop all DMA transactions generated by the I/O controllers 144 to the memory 132. On each transaction to or from a device 146 capable of participating in trusted I/O, the cryptographic engine 140 references the CID table 142 to find the CID corresponding to the DMA channel in the CID table 142. A match indicates that the channel is currently protected and that the cryptographic engine 140 should use the channel key associated with the channel to protect the data written to and/or the data read from memory 132 (depending on the direction of the channel).

Figure 2:
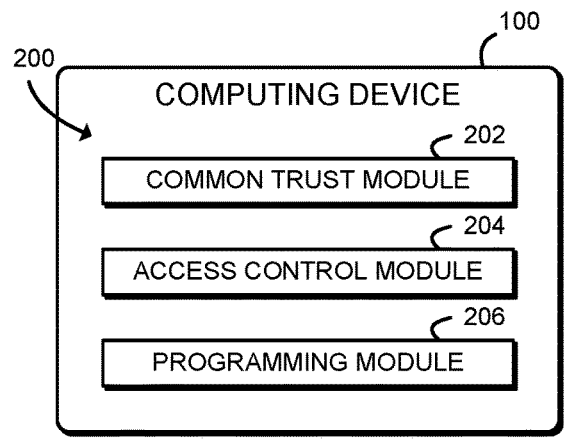
FIG. 2 is a simplified block diagram of at least one embodiment of an environment that may be established by the computing device of FIG. 1

Referring now to FIG. 2, in an illustrative embodiment, the computing device 100 establishes an environment 200 during operation. The illustrative environment 200 includes a common trust module 202, an access control module 204, and a programming module 206. The various modules of the environment 200 may be embodied as hardware, firmware, microcode, software, or a combination thereof. As such, in some embodiments, one or more of the modules of the environment 200 may be embodied as circuitry or collection of electrical devices (e.g., common trust circuitry 202, access control circuitry 204, and/or programming circuitry 206). It should be appreciated that, in such embodiments, one or more of the common trust circuitry 202, the access control circuitry 204, and/or the programming circuitry 206 may form a portion of one or more of the processor 120, the I/O subsystem 128, the cryptographic engine 140, and/or other components of the computing device 100. Additionally, in some embodiments, one or more of the illustrative modules may form a portion of another module and/or one or more of the illustrative modules may be independent of one another.

The common trust module 202 is configured to execute a trusted I/O core service. The trusted I/O core service has a cryptographic engine programming privileged granted by an operating system of the computing device 100. The common trust module 202 is further configured to receive a request from an application to protect a DMA channel associated with an I/O device 146. The application does not have the cryptographic engine programming privilege. In some embodiments, the common trust module 202 may be further configured to receive, by the trusted I/O core service from the operating system, a request to unprotect the DMA channel, to determine, by a privileged delegate associated with the DMA channel, whether a user of the computing device 100 has confirmed termination of protection of the DMA channel, and to unprotect, by the trusted I/O core service, the DMA channel if the user confirms the termination. The privileged delegate is established by the trusted I/O core service. The common trust module 202 is further configured to generate, by a cryptographic engine enclave (CEE), a channel encryption key in response to receiving the request to protect the DMA channel. The CEE is established by the trusted I/O core service and protected using the secure enclave support 124 of the processor 120. The common trust module 202 may be further configured to wrap, by the CEE, the channel encryption key to generate wrapped programming information, for example by executing an EBINDTIO instruction of the processor 120.

The access control module 204 is configured to receive, by the operating system, a request from the trusted I/O core service to protect the DMA channel in response to the trusted I/O core service receiving the request from the application. The access control module 204 is further configured to verify, by the operating system, the cryptographic engine programming privilege of the trusted I/O core service in response to receiving the request to protect the DMA channel In some embodiments, the access control module 204 may be further configured to determine, by the operating system, whether to unprotect the DMA and to request the trusted I/O core service to unprotect the DMA channel.

The programming module 206 is configured to program the cryptographic engine 140 to protect the DMA channel in response to verifying the cryptographic engine programming privilege of the trusted I/O core service. The programming module 206 may be further configured to unwrap, by the operating system, the wrapped programming information to generate unwrapped programming information. The programming module 206 may be configured to unwrap the wrapped programming information and program the unwrapped programming information to the cryptographic engine 140, for example by executing an UNWRAP instruction of the processor 120.

Figure 3:
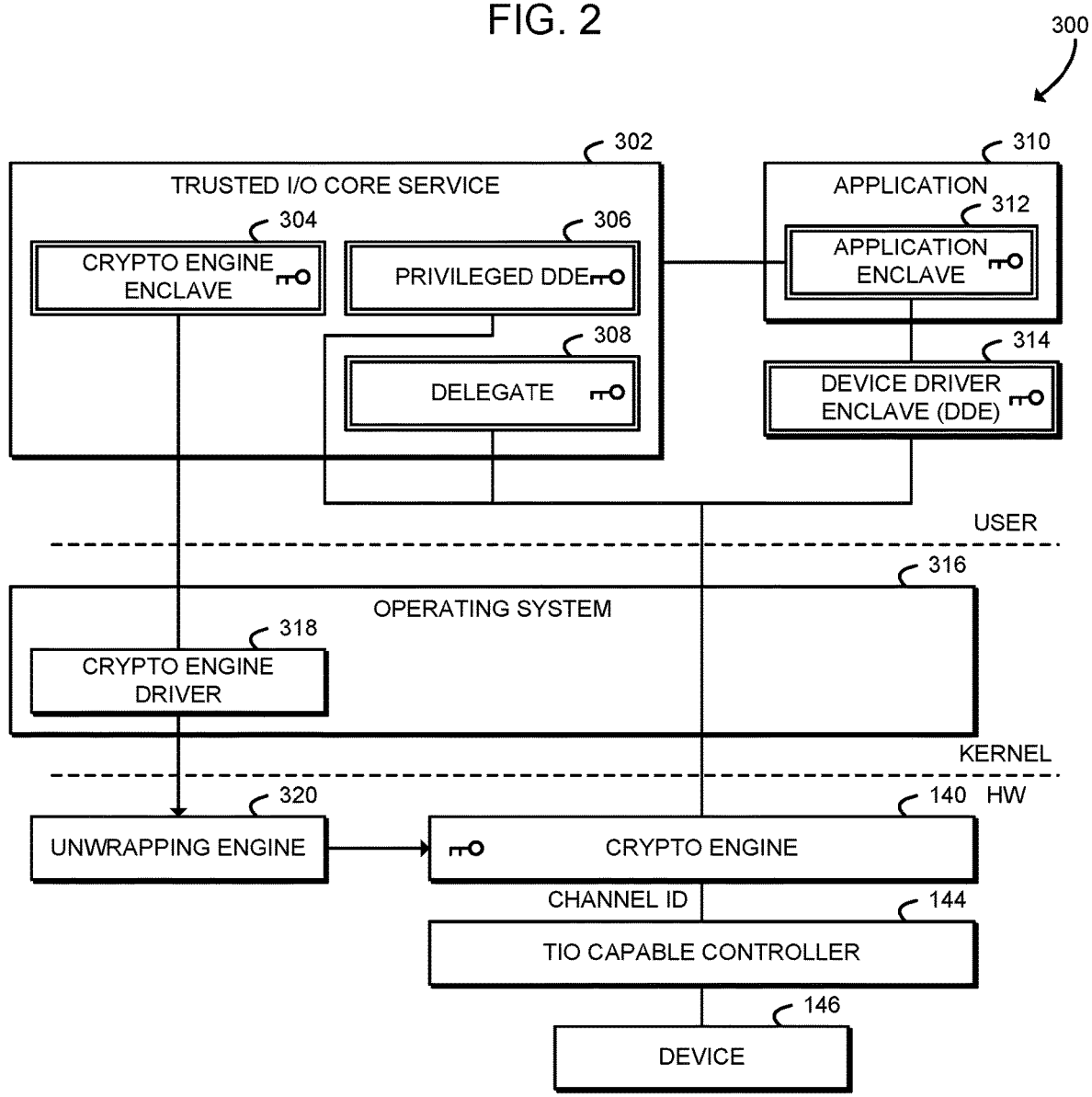
FIG. 3 is a simplified block diagram of at least one embodiment of a system architecture that may be established by the computing device of FIGS. 1-2.

Referring now to FIG. 3, diagram 300 illustrates a system architecture that may be established by the computing device 100. The system architecture includes a trusted I/O (TIO) core service 302, which may be embodied as an application, server, daemon, or other user-level process of the computing device 100. As described further below, the TIO core service 302 has a cryptographic engine programming privilege recognized by an operating system 316 and thus is allowed to control the cryptographic engine 140. The TIO core service 302 may be embodied as a privileged process in the sense that it is allowed to program the cryptographic engine 140 by instructing a kernel-mode driver (e.g., a cryptographic engine driver (CED) 318) to program the cryptographic engine 140. In the illustrative embodiment, the TIO core service 302 hosts several secure enclaves that inherit the privileges of the TIO core service 302. Each of the secure enclaves may be embodied as user-level code (e.g., ring-3 code) protected by the secure enclave support 124 of the processor 120. In particular, the TIO core service 302 establishes a crypto engine enclave (CEE) 304, one or more privileged device driver enclaves (DDEs) 306, and one or more privileged delegates 308.

The CEE 304 generates, maintains, or otherwise has access to encryption keys associated with one or more DMA channels. The CEE 304 programs the cryptographic engine 140 with channel encryption keys using the crypto engine programming support 126 of the processor 120. For example, the CEE 304 may execute one or more specialized processor instructions such as EBINDTIO to prepare binary data including wrapped channel programming information, including wrapped encryption keys that may be used to program the cryptographic engine 140. Each of privileged DDEs 306 may be embodied as a secure enclave that manages a specific I/O device 146 or a specific class of I/O devices 146, similar to an untrusted device driver. For example, in some embodiments an HID DDE 306 may parse human interface device (HID) reports. As described further below, each of the privileged delegates 308 may be embodied as a privileged DDE 306 that is authorized to determine on behalf of another software component whether it is secure to unprotect a particular DMA channel. In some embodiments, the TIO core service 302 may also establish additional secure enclaves used to enumerate, attest, and verify the I/O devices 146 of the computing device 100, such as a platform enumerator enclave and/or one or more secure bus enumerators. As described above, the TIO core service 302 and its components (e.g., the CEE 304, privileged DDEs 306, and/or delegates 308) are trusted by an operating system 316 of the computing device 100, and for example, may be provided or otherwise verified by the vendor of the operating system 316.

The system architecture may further include one or more unprivileged applications 310 and associated application enclaves 312 as well as one or more unprivileged DDEs 314. The unprivileged application enclaves 312 and/or the unprivileged DDEs 314 are not permitted to program the cryptographic engine 140 or otherwise access the CED 318 directly. Rather, the unprivileged application enclaves 312 and/or the unprivileged DDEs 314 may request the TIO core service 302 to establish one or more secure DMA channels that may be used for secure I/O with the associated I/O devices 146. As described further below, the unprivileged application enclaves 312 and/or the unprivileged DDEs 314 may be required to specify a privileged delegate 308 when requesting to encrypt a DMA channel. In contrast, the privileged DDEs 306 established by the TIO core service 302 (including the delegates 308 themselves) are allowed to encrypt DMA channels without specifying a delegate 308.

The system architecture further includes an operating system 316 and a crypto engine driver (CED) 318. The operating system 316 establishes a separate trust domain from the trusted I/O components of the computing device 100. For example, the operating system 316 may not have access to the secure internal state of secure enclaves protected by the secure enclave support 124, such as the CEE 304, the privileged DDEs 306, the delegates 308, the application enclave 312, and/or the unprivileged DDEs 314. The CED 318 may be embodied as a kernel module, kernel process, or other kernel-mode code (e.g., ring-0 code) of the computing device 100. The CED 318 provides wrapped programming information to the unwrapping engine 320, which may unwrap and verify the programming information and, if verified, program the channel programming information to the cryptographic engine 140. The CED 318 may restrict access to the unwrapping engine 320, for example by verifying that requests to unwrap the wrapped programming information originate from the TIO core service 302 or other privileged component of the computing device 100. In the illustrative embodiment, the unwrapping engine 320 is embodied as hardware and/or microcode resources of the processor 120. To access the unwrapping engine 320, the CED 318 may invoke one or more specialized, kernel-level processor instructions of the processor 120 such as an UNWRAP instruction. In some embodiments, the functions of the unwrapping engine 320 may be performed by the cryptographic engine 140 and/or other components of the computing device 100.

The illustrative embodiment discloses hardware cryptographic TIO using secure-enclave-based trusted execution environments (TEEs), as compared to VMM-based TEEs, for example. It should be understood that although the illustrative embodiment describes a secure-enclave-based TIO embodiment, this disclosure also applies to embodiments in which two or more trust domains coexist yet do not trust each other, or do not have sufficient information to act on behalf of each other (for example, VTIO and/or VSM by Microsoft®).

Figure 4:
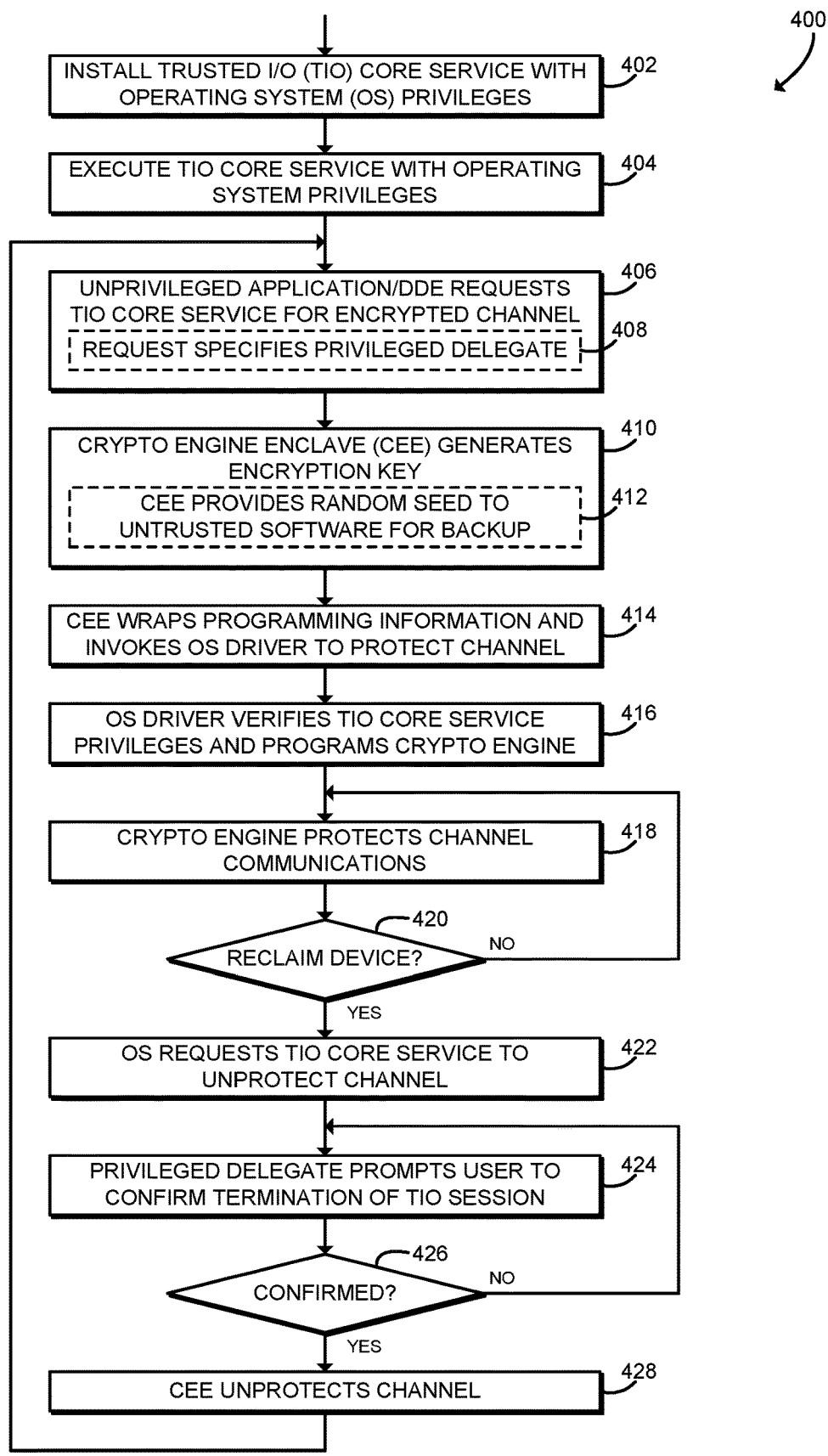
FIG. 4 is a simplified flow diagram of at least one embodiment of a method for trusted I/O access control that may be executed by the computing device of FIGS. 1-3.

Referring now to FIG. 4, in use, the computing device 100 may execute a method 400 for secure access control to the cryptographic engine 140. The method 400 begins with block 402, in which the computing device 100 installs the TIO core service 302 with one or more operating system 316 privileges. In particular, the TIO core service 302 is installed with privileges to access the CED 318 or otherwise control programming of the cryptographic engine 140. For example, the TIO core service 302 may be embodied as an operating system 316 process with a role-based privilege that may be inherited by any secure enclaves hosted by the TIO core service 302. The privilege associated with the TIO core service 302 may be assigned at installation time by a system administrator (for Microsoft® Windows™ operating systems 316), by the root user (for Linux® operating systems 316), or by another administrative role. The privilege associated with the TIO core service 302 may be embodied as a particular user and/or as membership in a particular group. For example, on a Linux-based operating system 316, during installation of the TIO core service 302, a special group (e.g., "sgxio_core") and a user (e.g., with the same name "sgxio_core") in that group may be created. The CED 318 may create one or more device nodes to receive system calls (e.g., IOCTLs) and may set permissions on each device node to require membership in the associated group. For example, a device node "/dev/sgxio_core" may be created with ownership set to user "root" and group "sgxio_core" and with permissions set to "rw-rw - - - -" (user and group read/writable), which may allow only root and members of the "sgxio_core" group to send IOCTLs to the CED 318.

In block 404, the computing device 100 executes the TIO core service 302 with the associated operating system 316 privileges. For example, the computing device 100 may execute the TIO core service 302 process to run in the user account "sgxio_core" in the group "sgxio_core," as described above. As described above, upon being executed, the TIO core service 302 may create or otherwise host one or more secure enclaves such as the CEE 304, one or more privileged DDEs 306, and/or one or more privileged delegates 308 that each inherit one or more operating system 316 privileges of the TIO core service 302. For example, each of the secure enclaves may also execute in the user account "sgxio_core" as described above.

In block 406, unprivileged software such as an application enclave 312 and/or DDE 314 requests the TIO core service 302 for an encrypted DMA channel with an I/O device 146 or class of I/O devices 146. For example, an application enclave 312 may request secure keyboard input from one or more keyboards 146 of the computing device 100. The unprivileged software may not have the privilege required to access the CED 318 or otherwise control programming of the cryptographic engine 140. For example, an unprivileged application enclave 312 may execute in an ordinary user account that is not included in the "sgxio_core" group and thus does not have the ability to send IOCTLs to the CED 318.

In some embodiments, in block 408 the request may specify a privileged delegate 308. As described further below, each privileged delegate 308 may securely determine whether a user has confirmed termination of the TIO session (i.e., confirmed that protection of a DMA channel is to be terminated). Each privileged delegate 308 is hosted by the TIO core service 302 and thus inherits the cryptographic engine 140 programming privilege of the TIO core service 302. Accordingly, each privileged delegate 308 is trusted by the TIO stack (e.g., by the TIO core service 302 and related components) not to unprotect a DMA channel improperly in order to purposefully leave confidential user input in the clear. In some embodiments, the computing device 100 may use a default privileged delegate 308 and/or a system-wide privileged delegate 308 that is used for all applications. For example, the computing device 100 may use a delegate 308 that monitors for a particular secure keyboard input (e.g., CTRL-ALT-DEL on traditional PC systems). Thus, in some embodiments the request for secure I/O may not expressly identify a delegate 308.

In block 410, after receiving the request for an encrypted DMA channel, the CEE 304 generates a channel encryption key to protect the requested DMA channel. For example, the encryption key may be derived using a processor instruction such as EGETKEY with random seed values (i.e., the "KEY ID" parameter to EGETKEY), which ties the derived keys to the identity of the CEE 304. The CEE 304 is trusted to never give out encryption keys to any other software entities except for the requesting enclave (e.g., the application enclave 312 and/or the unprivileged DDE 314). In some embodiments, in block 412 the CEE 304 may provide the random seed value to untrusted software (i.e., untrusted from the TIO stack's perspective) for backup purposes. For example, the CEE 304 may provide the random seed value to the application enclave 312, to the operating system 316, or to another untrusted entity. If the CEE 304 crashes, upon restart the CEE 304 may re-generate the channel encryption keys securely using the random seed value.

In block 414, the CEE 304 wraps channel programming information and invokes the CED 318 to protect the DMA channel. The channel programming information may include the encryption key as determined in block 410 as well as other programming information such as the channel identifier (CID) of the DMA channel to be programmed, a programming command, a random nonce that may be used for authentication and replay protection, and other programming information. The channel programming information may be stored in a binary structure such as a BIND_STRUCT structure. The CEE 304 may invoke a processor instruction of the processor 120 such as EBINDTIO to generate the wrapped programming information. The wrapped programming information may include the channel programming key encrypted with a key known by the unwrapping engine 320. As described above, the CEE 304 may provide the wrapped programming information to the CED 318, for example by invoking one or more system calls (e.g., IOCTLs) or other privileged functions of the computing device 100.

In block 416, the CED 318 verifies the cryptographic engine 140 programming privilege of the TIO core service 302 and, if successful, programs the cryptographic engine 140. As described above, the CED 318 may verify the privilege of the TIO core service 302 by requiring a particular group membership or other role-based privilege to access a system call interface of the CED 318. For example, the permissions of the device node associated with the CED 318 may require membership in the "sgxio_core" group. To program the cryptographic engine 140, the CED 318 may invoke a processor instruction of the processor 120 such as UNWRAP to unwrap the programming information and securely program the DMA channel. The UNWRAP instruction may cause the unwrapping engine 320 of the processor 120 to decrypt the wrapped channel programming key, verify the channel programming information, and copy the unwrapped channel programming information to the cryptographic engine 140.

In block 418, the cryptographic engine 140 protects channel communications between the unprivileged software and the I/O device 146. For example, the cryptographic engine 140 may intercept direct memory access (DMA) transactions and encrypt I/O data exchanged between an I/O device 146 and an unprivileged application enclave 312 and/or unprivileged DDE 314.

In block 420, the computing device 100 determines whether to reclaim the I/O device 146 associated with the protected DMA channel. For example, the operating system 316 may determine to reclaim the I/O device 146 if the associated unprivileged software (e.g., the application enclave 312 and/or the unprivileged DDE 314) crashes or otherwise terminates. If the I/O device 146 is not reclaimed in such circumstances, DMA transactions with that I/O device 146 may remain encrypted until the computing device 100 is reset, making the I/O device 146 unavailable to other applications and thus causing a denial of service. If the computing device 100 determines not to reclaim the I/O device 146, the method 400 loops back to block 418 and the cryptographic engine 140 continues to protect the DMA channel. If the computing device 100 determines to reclaim the I/O device 146, the method 400 advances to block 422.

In block 422, the operating system 316 requests the TIO core service 302 to unprotect the DMA channel associated with the I/O device 146 to be reclaimed. The operating system 316 may, for example, send a message to the TIO core service 302 using an inter-process communication facility or otherwise invoke the TIO core service 302.

In block 424, in response to the request to unprotect the DMA channel, the privileged delegate 308 associated with that DMA channel prompts the user to confirm termination of the TIO session. In some embodiments, the operating system 316 may prompt the user on behalf of the delegate 308. The delegate 308 may use any appropriate technique to securely (i.e., without receiving unprotected user input over the DMA channel) confirm termination with the user. Thus, the delegate 308 may decide whether it is secure to unprotect the I/O device 146 without knowing anything about the crashed application enclave 312 and/or DDE 314. Given that all past DMA traffic to/from the protected I/O device 146 was encrypted, it may be considered "secure" to unprotect the I/O device 146 as long as no more confidential data will be fed to the input device 146. Therefore, it may be considered secure to unprotect the I/O device 146 as long as the human user has acknowledged that no applications are processing his or her confidential input and that the I/O device 146 is about to be unprotected. A secure technique to receive confirmation from the human user may be to receive the confirmation through a different encrypted I/O device 146. For example, the privileged delegate 308 and/or the operating system 316 may display a message to the user and then the privileged delegate 308 may receive confirming user input through another encrypted input device 146, for example by receiving protected user input via a different DMA channel. Continuing that example, a computing device 100 having a keyboard 146 may receive the confirmation as a special combination of keys, so that it is considered "secure" to unprotect the DMA channel when the human user presses that combination of keys (e.g., similar to pressing CTRL+ALT+DEL to bring up a graphical login interface).

In block 426, the privileged delegate 308 determines whether the user has confirmed that the TIO session is terminated. The delegate 308 may consider it secure to unprotect the I/O device 146 after receiving the acknowledgement from the human user, who is considered to have stopped feeding sensitive input data to the I/O device 146 before making the acknowledgement. If the user has not confirmed, the method 400 loops back to block 424 to continue monitoring for user confirmation. While monitoring for user confirmation, the DMA channel and the associated input data remain protected. If the user has confirmed that the TIO session is terminated, the method 400 advances to block 428.

In block 428, the CEE 304 unprotects the DMA channel associated with the I/O device 146 to be reclaimed. To unprotect the DMA channel, the CEE 304 may perform operations similar to the request to protect the DMA channel described above in connection with blocks 414 to 416. For example, the CEE 304 may generate wrapped programming information and submit the wrapped programming information to the CED 318, which may unwrap the programming information and program the cryptographic engine 140 to unprotect the DMA channel. In many embodiments, the encryption key used to protect the DMA channel may be required to generate the wrapped programming information to unprotect the DMA channel. Therefore, the CEE 304 and/or other components of the TIO stack (e.g., the privileged delegate 308) may retain a copy of the encryption key or otherwise have access to the encryption key associated with each DMA channel. After unprotecting the DMA channel, I/O data may be communicated between the I/O device 146 and the memory 132 in the clear, and the method 400 loops back to block 406 to monitor for additional requests to protect DMA channels.

It should be appreciated that, in some embodiments, the method 400 may be embodied as various instructions stored on a computer-readable media, which may be executed by the processor 120 and/or other components of the computing device 100 to cause the computing device 100 to perform the corresponding method 400. The computer-readable media may be embodied as any type of media capable of being read by the computing device 100 including, but not limited to, the memory 132, the data storage device 134, other memory or data storage devices of the computing device 100, portable media readable by a peripheral device of the computing device 100, and/or other media.

EXAMPLES

Illustrative examples of the technologies disclosed herein are provided below. An embodiment of the technologies may include any one or more, and any combination of, the examples described below.

Example 1 includes a computing device for trusted I/O access control, the computing device comprising: a common trust module to (i) execute a trusted I/O core service, wherein the trusted I/O core service has a cryptographic engine programming privileged granted by an operating system of the computing device, and (ii) receive a request from an application to protect a DMA channel associated with an I/O device of the computing device, wherein the application does not have the cryptographic engine programming privilege; an access control module to (i) receive, by the operating system, a request from the trusted I/O core service to protect the DMA channel in response to receipt of the request from the application to protect the DMA channel, and (ii) verify, by the operating system, the cryptographic engine programming privilege of the trusted I/O core service in response to receipt of the request to protect the DMA channel; and a programming module to program a cryptographic engine of the computing device to protect the DMA channel in response to verification of the cryptographic engine programming privilege of the trusted I/O core service.

Example 2 includes the subject matter of Example 1, and further comprising a processor with secure enclave support, wherein the application comprises a secure enclave established with the secure enclave support of the processor.

Example 3 includes the subject matter of any of Examples 1 and 2, and wherein the operating system comprises a cryptographic engine driver.

Example 4 includes the subject matter of any of Examples 1-3, and wherein the common trust module is further to: receive, by the trusted I/O core service from the operating system, a request to unprotect the DMA channel in response to programming of the cryptographic engine to protect the DMA channel; determine, by a privileged delegate associated with the DMA channel, whether a user of the computing device has confirmed termination of protection of the DMA channel in response to receipt of the request to unprotect the DMA channel, wherein the privileged delegate is established by the trusted I/O core service; and unprotect, by the trusted I/O core service, the DMA channel in response to a determination that the user has confirmed termination of protection of the DMA channel.

Example 5 includes the subject matter of any of Examples 1-4, and wherein to determine whether the user of the computing device has confirmed termination of protection of the DMA channel comprises to receive protected user input via a protected DMA channel of the computing device.

Example 6 includes the subject matter of any of Examples 1-5, and wherein to receive the protected user input via the protected DMA channel comprises to receive the protected user input via a second DMA channel, wherein the second DMA channel is different from the DMA channel of the request to unprotect the DMA channel.

Example 7 includes the subject matter of any of Examples 1-6, and wherein to receive the request to protect the DMA channel comprises to receive a request that identifies the privileged delegate.

Example 8 includes the subject matter of any of Examples 1-7, and further comprising a processor with secure enclave support, wherein the privileged delegate comprises a secure enclave established with the secure enclave support of the processor.

Example 9 includes the subject matter of any of Examples 1-8, and wherein the access control module is further to: determine, by the operating system, whether to unprotect the DMA channel in response to the programming of the cryptographic engine to protect the DMA channel; and request, by the operating system, the trusted I/O core service to unprotect the DMA channel in response to a determination to unprotect the DMA channel.

Example 10 includes the subject matter of any of Examples 1-9, and wherein to determine whether to unprotect the DMA channel comprises to determine whether the application has terminated.

Example 11 includes the subject matter of any of Examples 1-10, and wherein the common trust module is further to (i) generate, by a cryptographic engine enclave (CEE) established by the trusted I/O core service, a channel encryption key in response to receipt of the request to protect the DMA channel, and (ii) wrap, by the CEE, the channel encryption key to generate wrapped programming information; and to receive the request from the trusted I/O core service to protect the DMA channel comprises to receive the wrapped programming information from the trusted I/O core service.

Example 12 includes the subject matter of any of Examples 1-11, and wherein to wrap the channel encryption key comprises to invoke a processor instruction of a processor of the computing device to generate the wrapped programming information.

Example 13 includes the subject matter of any of Examples 1-12, and wherein to generate the channel encryption key comprises to: generate a random seed used to generate the channel encryption key; and provide the random seed to untrusted software of the computing device.

Example 14 includes the subject matter of any of Examples 1-13, and wherein: the programming module is further to unwrap, by the operating system, the wrapped programming information to generate unwrapped programming information in response to receipt of the wrapped programming information; and to program the cryptographic engine comprises to program the cryptographic engine with the unwrapped programming information to protect the DMA channel in response to an unwrap of the wrapped programming information.

Example 15 includes the subject matter of any of Examples 1-14, and wherein to unwrap the wrapped programming information comprises to invoke a processor instruction of a processor of the computing device to generate the unwrapped programming information.

Example 16 includes a method for trusted I/O access control, the method comprising: executing, by a computing device, a trusted I/O core service, wherein the trusted I/O core service has a cryptographic engine programming privileged granted by an operating system of the computing device; receiving, by the trusted I/O core service, a request from an application to protect a DMA channel associated with an I/O device of the computing device, wherein the application does not have the cryptographic engine programming privilege; receiving, by the operating system, a request from the trusted I/O core service to protect the DMA channel in response to receiving the request from the application to protect the DMA channel; verifying, by the operating system, the cryptographic engine programming privilege of the trusted I/O core service in response to receiving the request to protect the DMA channel; and programming, by the operating system, a cryptographic engine of the computing device to protect the DMA channel in response to verifying the cryptographic engine programming privilege of the trusted I/O core service.

Example 17 includes the subject matter of Example 16, and wherein the application comprises a secure enclave established with secure enclave support of a processor of the computing device.

Example 18 includes the subject matter of any of Examples 16 and 17, and wherein the operating system comprises a cryptographic engine driver.

Example 19 includes the subject matter of any of Examples 16-18, and further comprising: receiving, by the trusted I/O core service from the operating system, a request to unprotect the DMA channel in response to programming the cryptographic engine to protect the DMA channel; determining, by a privileged delegate associated with the DMA channel, whether a user of the computing device has confirmed termination of protection of the DMA channel in response to receiving the request to unprotect the DMA channel, wherein the privileged delegate is established by the trusted I/O core service; and unprotecting, by the trusted I/O core service, the DMA channel in response to determining that the user has confirmed termination of protection of the DMA channel.

Example 20 includes the subject matter of any of Examples 16-19, and wherein determining whether the user of the computing device has confirmed termination of protection of the DMA channel comprises receiving protected user input via a protected DMA channel of the computing device.

Example 21 includes the subject matter of any of Examples 16-20, and wherein receiving the protected user input via the protected DMA channel comprises receiving the protected user input via a second DMA channel, wherein the second DMA channel is different from the DMA channel of the request to unprotect the DMA channel.

Example 22 includes the subject matter of any of Examples 16-21, and wherein receiving the request to protect the DMA channel comprises receiving a request that identifies the privileged delegate.

Example 23 includes the subject matter of any of Examples 16-22, and wherein the privileged delegate comprises a secure enclave established with secure enclave support of a processor of the computing device.

Example 24 includes the subject matter of any of Examples 16-23, and further comprising: determining, by the operating system, whether to unprotect the DMA channel in response to programming the cryptographic engine to protect the DMA channel; and requesting, by the operating system, the trusted I/O core service to unprotect the DMA channel in response to determining to unprotect the DMA channel.

Example 25 includes the subject matter of any of Examples 16-24, and wherein determining whether to unprotect the DMA channel comprises determining whether the application has terminated.

Example 26 includes the subject matter of any of Examples 16-25, and further comprising: generating, by a cryptographic engine enclave (CEE) established by the trusted I/O core service, a channel encryption key in response to receiving the request to protect the DMA channel; and wrapping, by the CEE, the channel encryption key to generate wrapped programming information; wherein receiving the request from the trusted I/O core service to protect the DMA channel comprises receiving the wrapped programming information from the trusted I/O core service.

Example 27 includes the subject matter of any of Examples 16-26, and wherein wrapping the channel encryption key comprises invoking a processor instruction of a processor of the computing device to generate the wrapped programming information.

Example 28 includes the subject matter of any of Examples 16-27, and wherein generating the channel encryption key comprises: generating a random seed used to generate the channel encryption key; and providing the random seed to untrusted software of the computing device.

Example 29 includes the subject matter of any of Examples 16-28, and further comprising: unwrapping, by the operating system, the wrapped programming information to generate unwrapped programming information in response to receiving the wrapped programming information; wherein programming the cryptographic engine comprises programming the cryptographic engine with the unwrapped programming information to protect the DMA channel in response to unwrapping the wrapped programming information.

Example 30 includes the subject matter of any of Examples 16-29, and wherein unwrapping the wrapped programming information comprises invoking a processor instruction of a processor of the computing device to generate the unwrapped programming information.

Example 31 includes a computing device comprising: a processor; and a memory having stored therein a plurality of instructions that when executed by the processor cause the computing device to perform the method of any of Examples 16-30.

Example 32 includes one or more machine readable storage media comprising a plurality of instructions stored thereon that in response to being executed result in a computing device performing the method of any of Examples 16-30.

Example 33 includes a computing device comprising means for performing the method of any of Examples 16-30.

Example 34 includes a computing device for trusted I/O access control, the computing device comprising: means for executing a trusted I/O core service, wherein the trusted I/O core service has a cryptographic engine programming privileged granted by an operating system of the computing device; means for receiving, by the trusted I/O core service, a request from an application to protect a DMA channel associated with an I/O device of the computing device, wherein the application does not have the cryptographic engine programming privilege; means for receiving, by the operating system, a request from the trusted I/O core service to protect the DMA channel in response to receiving the request from the application to protect the DMA channel; means for verifying, by the operating system, the cryptographic engine programming privilege of the trusted I/O core service in response to receiving the request to protect the DMA channel; and means for programming, by the operating system, a cryptographic engine of the computing device to protect the DMA channel in response to verifying the cryptographic engine programming privilege of the trusted I/O core service.

Example 35 includes the subject matter of Example 34, and wherein the application comprises a secure enclave established with secure enclave support of a processor of the computing device.

Example 36 includes the subject matter of any of Examples 34 and 35, and wherein the operating system comprises a cryptographic engine driver.

Example 37 includes the subject matter of any of Examples 34-36, and further comprising: means for receiving, by the trusted I/O core service from the operating system, a request to unprotect the DMA channel in response to programming the cryptographic engine to protect the DMA channel; means for determining, by a privileged delegate associated with the DMA channel, whether a user of the computing device has confirmed termination of protection of the DMA channel in response to receiving the request to unprotect the DMA channel, wherein the privileged delegate is established by the trusted I/O core service; and means for unprotecting, by the trusted I/O core service, the DMA channel in response to determining that the user has confirmed termination of protection of the DMA channel.

Example 38 includes the subject matter of any of Examples 34-37, and wherein the means for determining whether the user of the computing device has confirmed termination of protection of the DMA channel comprises means for receiving protected user input via a protected DMA channel of the computing device.

Example 39 includes the subject matter of any of Examples 34-38, and wherein the means for receiving the protected user input via the protected DMA channel comprises means for receiving the protected user input via a second DMA channel, wherein the second DMA channel is different from the DMA channel of the request to unprotect the DMA channel.

Example 40 includes the subject matter of any of Examples 34-39, and wherein the means for receiving the request to protect the DMA channel comprises means for receiving a request that identifies the privileged delegate.

Example 41 includes the subject matter of any of Examples 34-40, and wherein the privileged delegate comprises a secure enclave established with secure enclave support of a processor of the computing device.

Example 42 includes the subject matter of any of Examples 34-41, and further comprising: means for determining, by the operating system, whether to unprotect the DMA channel in response to programming the cryptographic engine to protect the DMA channel; and means for requesting, by the operating system, the trusted I/O core service to unprotect the DMA channel in response to determining to unprotect the DMA channel.

Example 43 includes the subject matter of any of Examples 34-42, and wherein the means for determining whether to unprotect the DMA channel comprises means for determining whether the application has terminated.

Example 44 includes the subject matter of any of Examples 34-43, and further comprising: means for generating, by a cryptographic engine enclave (CEE) established by the trusted I/O core service, a channel encryption key in response to receiving the request to protect the DMA channel; and means for wrapping, by the CEE, the channel encryption key to generate wrapped programming information; wherein the means for receiving the request from the trusted I/O core service to protect the DMA channel comprises means for receiving the wrapped programming information from the trusted I/O core service.

Example 45 includes the subject matter of any of Examples 34-44, and wherein the means for wrapping the channel encryption key comprises means for invoking a processor instruction of a processor of the computing device to generate the wrapped programming information.

Example 46 includes the subject matter of any of Examples 34-45, and wherein the means for generating the channel encryption key comprises: means for generating a random seed used to generate the channel encryption key; and means for providing the random seed to untrusted software of the computing device.

Example 47 includes the subject matter of any of Examples 34-46, and further comprising: means for unwrapping, by the operating system, the wrapped programming information to generate unwrapped programming information in response to receiving the wrapped programming information; wherein the means for programming the cryptographic engine comprises means for programming the cryptographic engine with the unwrapped programming information to protect the DMA channel in response to unwrapping the wrapped programming information.

Example 48 includes the subject matter of any of Examples 34-47, and wherein the means for unwrapping the wrapped programming information comprises means for invoking a processor instruction of a processor of the computing device to generate the unwrapped programming information.

The invention claimed is:

1. A computing device for trusted I/O access control, the computing device comprising:
a processor; and
one or more memory devices having stored therein a plurality of instructions that, when executed by the processor, cause the computing device to establish:
a common trust module to (i) execute a trusted I/O core service, wherein the trusted I/O core service has a cryptographic engine programming privilege granted by an operating system of the computing device, and (ii) receive a request from an application to protect a DMA channel associated with an I/O device of the computing device, wherein the application does not have the cryptographic engine programming privilege;
an access control module to (i) receive, by the operating system, a request from the trusted I/O core service to protect the DMA channel in response to receipt of the request from the application to protect the DMA channel, and (ii) verify, by the operating system, the cryptographic engine programming privilege of the trusted I/O core service in response to receipt of the request to protect the DMA channel; and
a programming module to program a cryptographic engine of the computing device to protect the DMA channel in response to verification of the cryptographic engine programming privilege of the trusted I/O core service.

2. The computing device of claim 1, wherein the processor comprises secure enclave support, and wherein the application comprises a secure enclave established with the secure enclave support of the processor.

3. The computing device of claim 1, wherein the common trust module is further to:
receive, by the trusted I/O core service from the operating system, a request to unprotect the DMA channel in response to programming of the cryptographic engine to protect the DMA channel;
determine, by a privileged delegate associated with the DMA channel, whether a user of the computing device has confirmed termination of protection of the DMA channel in response to receipt of the request to unprotect the DMA channel, wherein the privileged delegate is established by the trusted I/O core service; and
unprotect, by the trusted I/O core service, the DMA channel in response to a determination that the user has confirmed termination of protection of the DMA channel.

4. The computing device of claim 3, wherein to determine whether the user of the computing device has confirmed termination of protection of the DMA channel comprises to receive protected user input via a protected DMA channel of the computing device.

5. The computing device of claim 4, wherein to receive the protected user input via the protected DMA channel comprises to receive the protected user input via a second DMA channel, wherein the second DMA channel is different from the DMA channel of the request to unprotect the DMA channel.

6. The computing device of claim 3, wherein the processor comprises secure enclave support, and wherein the privileged delegate comprises a secure enclave established with the secure enclave support of the processor.

7. The computing device of claim 3, wherein the access control module is further to:
determine, by the operating system, whether to unprotect the DMA channel in response to the programming of the cryptographic engine to protect the DMA channel; and
request, by the operating system, the trusted I/O core service to unprotect the DMA channel in response to a determination to unprotect the DMA channel.

8. The computing device of claim 7, wherein to determine whether to unprotect the DMA channel comprises to determine whether the application has terminated.

9. The computing device of claim 1, wherein:
the common trust module is further to (i) generate, by a cryptographic engine enclave (CEE) established by the trusted I/O core service, a channel encryption key in response to receipt of the request to protect the DMA channel, and (ii) wrap, by the CEE, the channel encryption key to generate wrapped programming information; and
to receive the request from the trusted I/O core service to protect the DMA channel comprises to receive the wrapped programming information from the trusted I/O core service.

10. The computing device of claim 9, wherein to wrap the channel encryption key comprises to invoke a processor instruction of the processor of the computing device to generate the wrapped programming information.

11. The computing device of claim 9, wherein:
the programming module is further to unwrap, by the operating system, the wrapped programming information to generate unwrapped programming information in response to receipt of the wrapped programming information; and
to program the cryptographic engine comprises to program the cryptographic engine with the unwrapped programming information to protect the DMA channel in response to an unwrap of the wrapped programming information.

12. The computing device of claim 11, wherein to unwrap the wrapped programming information comprises to invoke a processor instruction of the processor of the computing device to generate the unwrapped programming information.

13. A method for trusted I/O access control, the method comprising:
executing, by a computing device, a trusted I/O core service, wherein the trusted I/O core service has a cryptographic engine programming privilege granted by an operating system of the computing device;
receiving, by the trusted I/O core service, a request from an application to protect a DMA channel associated with an I/O device of the computing device, wherein the application does not have the cryptographic engine programming privilege;
receiving, by the operating system, a request from the trusted I/O core service to protect the DMA channel in response to receiving the request from the application to protect the DMA channel;
verifying, by the operating system, the cryptographic engine programming privilege of the trusted I/O core service in response to receiving the request to protect the DMA channel; and
programming, by the operating system, a cryptographic engine of the computing device to protect the DMA channel in response to verifying the cryptographic engine programming privilege of the trusted I/O core service.

14. The method of claim 13, wherein the application comprises a secure enclave established with secure enclave support of a processor of the computing device.

15. The method of claim 13, further comprising:
receiving, by the trusted I/O core service from the operating system, a request to unprotect the DMA channel in response to programming the cryptographic engine to protect the DMA channel;
determining, by a privileged delegate associated with the DMA channel, whether a user of the computing device has confirmed termination of protection of the DMA channel in response to receiving the request to unprotect the DMA channel, wherein the privileged delegate is established by the trusted I/O core service; and
unprotecting, by the trusted I/O core service, the DMA channel in response to determining that the user has confirmed termination of protection of the DMA channel.

16. The method of claim 15, wherein determining whether the user of the computing device has confirmed termination of protection of the DMA channel comprises receiving protected user input via a protected DMA channel of the computing device.

17. The method of claim 15, further comprising:
determining, by the operating system, whether to unprotect the DMA channel in response to programming the cryptographic engine to protect the DMA channel; and
requesting, by the operating system, the trusted I/O core service to unprotect the DMA channel in response to determining to unprotect the DMA channel.

18. The method of claim 13, further comprising:
generating, by a cryptographic engine enclave (CEE) established by the trusted I/O core service, a channel encryption key in response to receiving the request to protect the DMA channel; and wrapping, by the CEE, the channel encryption key to generate wrapped programming information;

wherein receiving the request from the trusted I/O core service to protect the DMA channel comprises receiving the wrapped programming information from the trusted I/O core service.

19. One or more non-transitory, machine readable storage media comprising a plurality of instructions that in response to being executed cause a computing device to:

execute a trusted I/O core service, wherein the trusted I/O core service has a cryptographic engine programming privilege granted by an operating system of the computing device;

receive, by the trusted I/O core service, a request from an application to protect a DMA channel associated with an I/O device of the computing device, wherein the application does not have the cryptographic engine programming privilege;

receive, by the operating system, a request from the trusted I/O core service to protect the DMA channel in response to receiving the request from the application to protect the DMA channel;

verify, by the operating system, the cryptographic engine programming privilege of the trusted I/O core service in response to receiving the request to protect the DMA channel; and program, by the operating system, a cryptographic engine of the computing device to protect the DMA channel in response to verifying the cryptographic engine programming privilege of the trusted I/O core service.

20. The one or more non-transitory, machine readable storage media of claim 19, wherein the application comprises a secure enclave established with secure enclave support of a processor of the computing device.

21. The one or more non-transitory, machine readable storage media of claim 19, further comprising a plurality of instructions that in response to being executed cause the computing device to:

receive, by the trusted I/O core service from the operating system, a request to unprotect the DMA channel in response to programming the cryptographic engine to protect the DMA channel;

determine, by a privileged delegate associated with the DMA channel, whether a user of the computing device has confirmed termination of protection of the DMA channel in response to receiving the request to unprotect the DMA channel, wherein the privileged delegate is established by the trusted I/O core service; and unprotect, by the trusted I/O core service, the DMA channel in response to determining that the user has confirmed termination of protection of the DMA channel.

22. The one or more non-transitory, machine readable storage media of claim 21, wherein to determine whether the user of the computing device has confirmed termination of protection of the DMA channel comprises to receive protected user input via a protected DMA channel of the computing device.

23. The one or more non-transitory, machine readable storage media of claim 21, further comprising a plurality of instructions that in response to being executed cause the computing device to:

determine, by the operating system, whether to unprotect the DMA channel in response to programming the cryptographic engine to protect the DMA channel; and request, by the operating system, the trusted I/O core service to unprotect the DMA channel in response to determining to unprotect the DMA channel.

24. The one or more non-transitory, machine readable storage media of claim 19, further comprising a plurality of instructions that in response to being executed cause the computing device to:

generate, by a cryptographic engine enclave (CEE) established by the trusted I/O core service, a channel encryption key in response to receiving the request to protect the DMA channel; and wrap, by the CEE, the channel encryption key to generate wrapped programming information;

wherein to receive the request from the trusted I/O core service to protect the DMA channel comprises to receive the wrapped programming information from the trusted I/O core service.

* * * * *